United States Patent
Hodjat et al.

(10) Patent No.: US 7,892,124 B2
(45) Date of Patent: Feb. 22, 2011

(54) DECOUPLING ISOLATOR

(75) Inventors: Yahya Hodjat, Oxford, MI (US); Marc R. Cadarette, London (CA); Lin Zhu, Rochester Hills, MI (US)

(73) Assignee: The Gates Corporation, Denver, CO (US)

( * ) Notice: Subject to any disclaimer, the term of this patent is extended or adjusted under 35 U.S.C. 154(b) by 456 days.

(21) Appl. No.: 12/074,895

(22) Filed: Mar. 7, 2008

(65) Prior Publication Data

US 2009/0223775 A1 Sep. 10, 2009

(51) Int. Cl.
*F16D 3/00* (2006.01)

(52) U.S. Cl. .......................... 474/94; 474/70; 192/55.2; 192/212

(58) Field of Classification Search .................... 474/70, 474/94; 192/41 R, 55.2, 56.2, 212, 77
See application file for complete search history.

(56) References Cited

U.S. PATENT DOCUMENTS

| | | | |
|---|---|---|---|
| 3,750,785 A | 8/1973 | Smith et al. ................... 192/81 |
| 4,813,525 A | 3/1989 | Rangert et al. ............... 192/415 |
| 5,377,962 A | 1/1995 | Ochs et al. .................... 267/281 |
| 6,044,943 A * | 4/2000 | Bytzek et al. ............. 192/41 R |
| 6,083,130 A * | 7/2000 | Mevissen et al. ............... 474/70 |
| 7,591,357 B2 * | 9/2009 | Antchak et al. ............ 192/55.5 |
| 2007/0037644 A1 * | 2/2007 | Mevissen et al. ............... 474/70 |
| 2008/0207364 A1 * | 8/2008 | Schebitz et al. ................ 474/94 |
| 2009/0197719 A1 * | 8/2009 | Ali et al. ........................ 474/94 |

FOREIGN PATENT DOCUMENTS

| | | |
|---|---|---|
| EP | 1 279 807 A | 1/2003 |
| NO | 8802394 | 4/1990 |

* cited by examiner

*Primary Examiner*—Emmanuel M Marcelo
(74) *Attorney, Agent, or Firm*—J.A. Thurnau, Esq.; P.N. Dunlap, Esq.; T.A. Dougherty, Esq.

(57) ABSTRACT

A decoupling isolator comprising a pulley, a hub member comprising a stop, a flat wire spiral spring having an end fixedly connected to the pulley, the flat wire spiral spring having another end engageable with the stop to limit a rotation of the pulley.

3 Claims, 4 Drawing Sheets

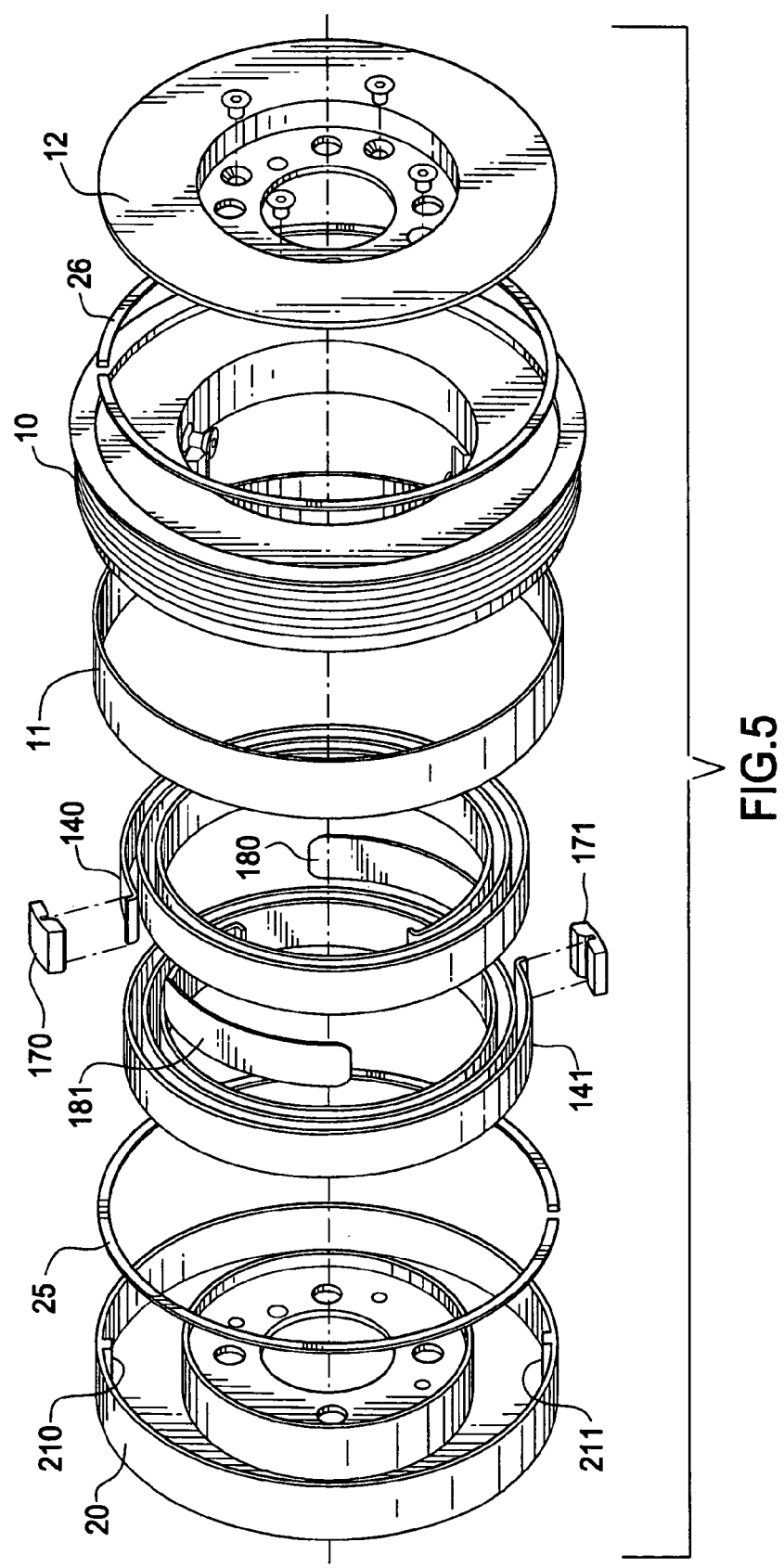

DECOUPLING ISOLATOR

FIELD OF THE INVENTION

The invention relates to a decoupling isolator and more particularly, to a decoupling isolator having a flat wire spiral spring engagable with a stop to limit a rotation of the pulley.

BACKGROUND OF THE INVENTION

Diesel engine usage for passenger car application is increasing due to the benefit of better fuel economy. Further, gasoline engines are increasing compression ratios to improve the fuel efficiency. As a result, diesel and gasoline engine accessory drive systems have to overcome the vibrations of greater magnitude from crankshafts due to above mentioned changes in engines.

With increased crankshaft vibration in addition to high acceleration/deceleration rates and high alternator inertia the engine accessory drive system is often experiencing belt chirp noise due to belt slip. This will also reduce the belt operating life.

Crankshaft isolators and alternator decouplers/isolators have been widely used for engines with high angular vibration to filter out vibration in engine operation speed range. However, although a crankshaft isolator can function very well in engine running speed range; it still presents problems during engine start-up or shut-down due to the natural frequency of the isolator itself.

An alternator decoupler/isolator can eliminate the belt slipping issue at an alternator pulley, but it cannot resolve belt slip taking place at the crankshaft pulley. For some engines, both a crankshaft isolator and alternator decoupler/isolator has to be used together. Unfortunately, this adds to the cost of the accessory drive system significantly and often vehicle manufacturers are not willing to pay for it.

Representative of the art is U.S. Pat. No. 6,044,943 which discloses a crankshaft decoupler has a mounting hub, a pulley rotatably mounted on the mounting hub, an annular carrier mounted within said pulley, a biasing device mounted therebetween, and a one way clutch mounted between the annular carrier and the pulley. The biasing device cushions the belt drive from crankshaft impulses and lowers the angular resonant frequency of the belt system. The one way clutch prevents sudden reversal of the belt tension in the drive due to start/stop of the engine or sudden deceleration of the engine and prevents momentary reverse slip belt squeal as a result of the tensioners' inadequate output for the reverse mode. The one way clutch limits the maximum amount of torque which may be transmitted preventing belt slippage during momentary overload.

What is needed is a decoupling isolator having a flat wire spiral spring engagable with a stop to limit a rotation of the pulley. The present invention meets this need.

SUMMARY OF THE INVENTION

The primary aspect of the invention is to provide a decoupling isolator having a flat wire spiral spring engagable with a stop to limit a rotation of the pulley.

Other aspects of the invention will be pointed out or made obvious by the following description of the invention and the accompanying drawings.

The invention comprises a decoupling isolator comprising a pulley, a hub member comprising a stop, a flat wire spiral spring having an end fixedly connected to the pulley, the flat wire spiral spring having another end engageable with the stop to limit a rotation of the pulley.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 5 is an exploded view of the decoupling isolator in FIG. 4.

DETAILED DESCRIPTION OF THE PREFERRED EMBODIMENTS

Figure 1:
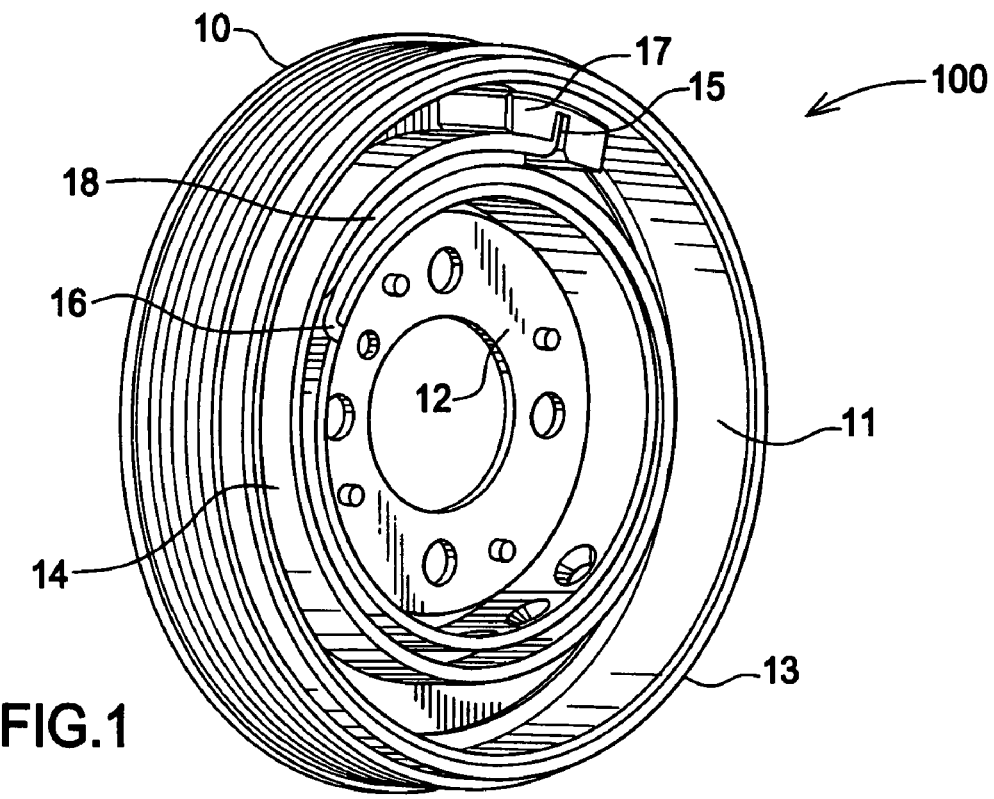
FIG. 1 is a perspective view of the decoupling isolator.

FIG. 1 is a perspective view of the decoupling isolator. Decoupler 100 comprises a pulley 10. A radial bushing 11 is engaged with an inner surface 13 of pulley 10. Bushing 11 is engaged with surface 13. Hub member 20 is omitted for clarity, see FIG. 2.

A hub plate 12 is cooperatively engaged with pulley 10. Hub plate 12 is not fixedly connected to pulley 10. Instead, hub plate 12 is fixedly connected to hub stop member 20, see FIG. 2.

A flat wire spiral spring 14 is connected to the pulley 10 by end 16. An end 15 of spring 14 is engaged with a spring support 17. Spring support 17 engages a stop 21 in hub member 20. Spiral spring 14 may comprise either a flat wire or round wire.

Disposed between volutes of spring 14 is a plastic spring support 18.

Figure 2:
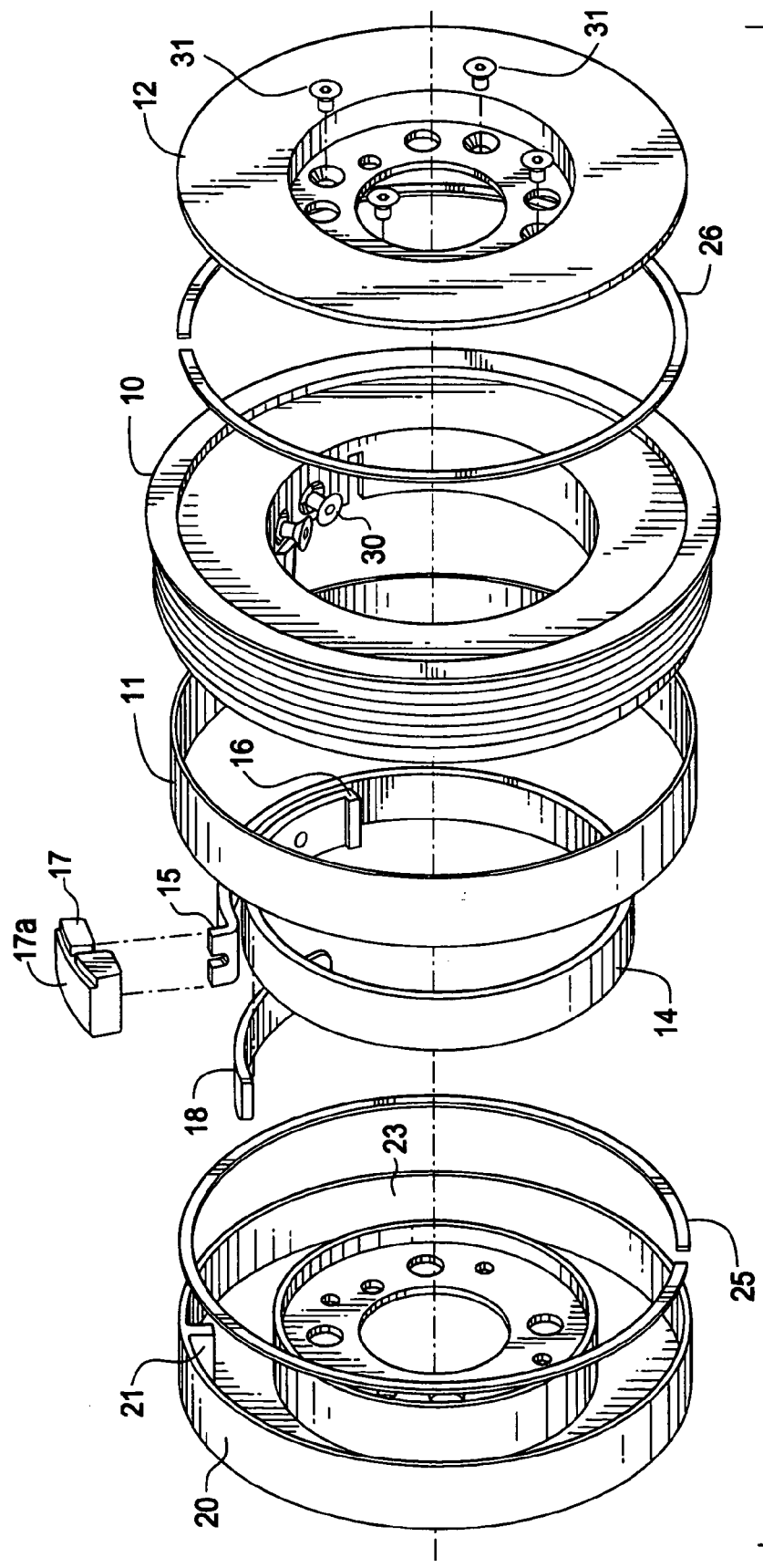
FIG. 2 is an exploded view of the decoupling isolator in FIG. 1.

FIG. 2 is an exploded view of the decoupling isolator in FIG. 1. Surface 17a of spring support 17 slidingly engages an inner surface 23 of hub member 20. Axial bushing 25 is disposed between hub member 20 and pulley 10. Bushing 25 slidingly facilitates movement between the hub member 20 and pulley 10. Axial bushing 26 is disposed between hub plate 12 and pulley 10. Bushing 26 slidingly facilitates movement between the hub member 20 and the pulley 10.

Figure 3:
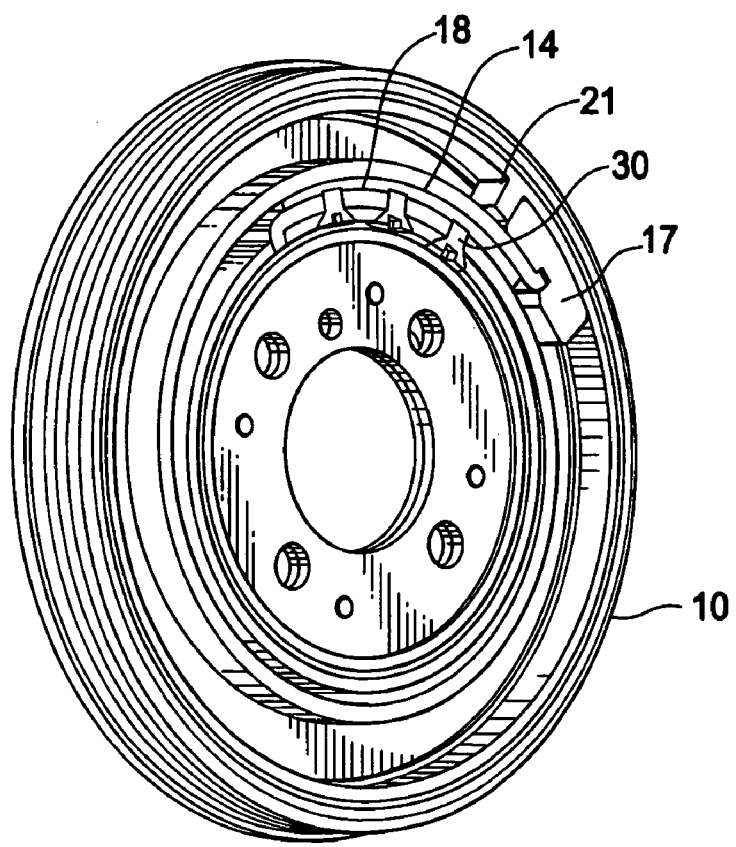
FIG. 3 is a cross-sectional perspective view of the decoupling isolator in FIG. 1.

Spring 14 is fixedly connected to pulley 10 by fasteners 30, see FIG. 3. Hub plate 12 is fixedly connected to hub member 20 by fasteners 31. The decoupler is connected to an engine crankshaft (not shown) by use of fasteners through hub plate 12. Spring support 17 engages stop 21 on hub member 20.

Pulley 10 can rotate relative to the hub member 20, limited by stop 21. Spring 14 winds and contacts stop 21 to absorb the angular vibration in a first direction (drive direction). During periods of deceleration spring 14 (and thereby pulley 10) will simply decouple from stop 21 and turn freely in the opposite direction for 360 degrees, 180 degrees, 120 degrees, etc. until spring support 17 again contacts stop 21. The range of free motion depends on the number of spiral springs 14 and the number of stop tabs 21.

Support 18 prevents the volutes from collapsing on each other causing support 17 to "ratchet" past stop 21 during periods of hard drive. Support 18 also allows some sliding movement of the volutes with respect to each other.

FIG. 3 is a cross-sectional perspective view of the decoupling isolator in FIG. 1. Fasteners 30 fixedly connect end 16 to pulley 10. Support 17 is shown engaged with stop 21.

The range of relative rotational movement of the pulley with respect to the hub member is approximately 360°. This is because one spring and one stop are used.

Figure 4:
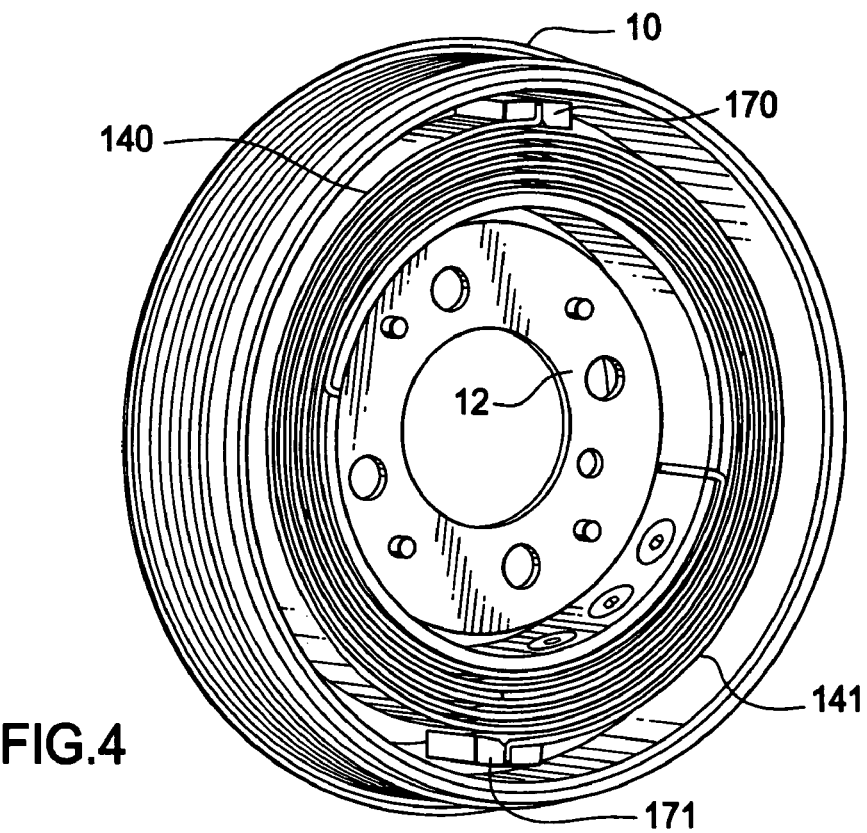
FIG. 4 is a perspective view of an alternate embodiment of the decoupling isolator.
Figure 6:
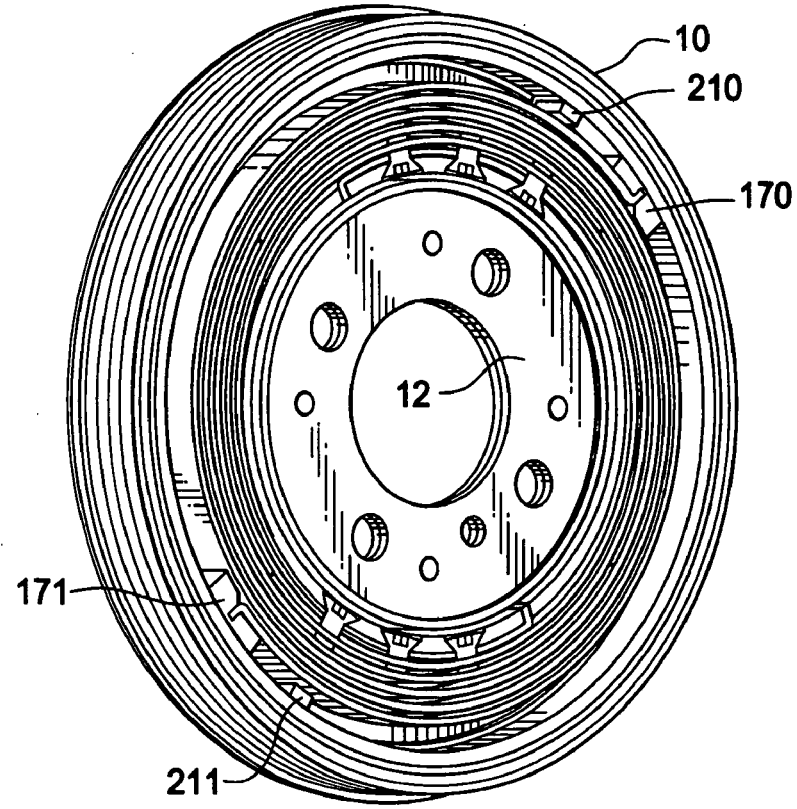
FIG. 6 is a cross-sectional perspective view of the decoupling isolator in FIG. 4.

FIG. 4 is a perspective view of an alternate embodiment of the decoupling isolator. With the exception of the following described differences, the decoupler in FIGS. 4, 5, 6 is the same as described in FIGS. 1, 2, 3. In this alternate embodiment instead of a single flat wire spiral spring there are two flat wire spiral springs 140 and 141.

FIG. 5 is an exploded view of the decoupling isolator in FIG. 4. An end of each spring is connected to a spring support 170 and 171 respectively. Springs 140 and 141 are each connected to pulley 10. Each spring support 170, 171 engages a stop 210, 211 respectively.

The range of rotational movement of the pulley with respect to the hub member is approximately 180°. This is because two springs and two stops are used. The stops are located 180° from each other.

FIG. 6 is a cross-sectional perspective view of the decoupling isolator in FIG. 4. In a drive direction, spring support 170 will contact stop 210 and spring support 171 will contact stop 211.

In the opposite direction, for example during deceleration of an engine, pulley 10 will rotate through approximately 180° causing support 171 to contact stop 210 and support 170 to contact stop 211.

Although a form of the invention has been described herein, it will be obvious to those skilled in the art that variations may be made in the construction and relation of parts without departing from the spirit and scope of the invention described herein.

We claim:

1. A decoupling isolator comprising:
   a pulley;
   a hub member comprising a stop;
   a flat wire spiral spring having an end fixedly connected to the pulley;
   the flat wire spiral spring having another end engageable with the stop to limit a rotation of the pulley.

2. The decoupling isolator as in claim 1 further comprising:
   two or more flat wire spiral springs; and
   two or more stops, each stop cooperatively disposed to engage each flat wire spiral spring.

3. The decoupling isolator as in claim 1 further comprising a support disposed between flat wire spiral spring volutes.

* * * * *